Feb. 26, 1957  M. S. MARTIN ET AL  2,782,761
AUTOMATIC POULTRY FEEDER
Filed Aug. 11, 1951  4 Sheets-Sheet 1
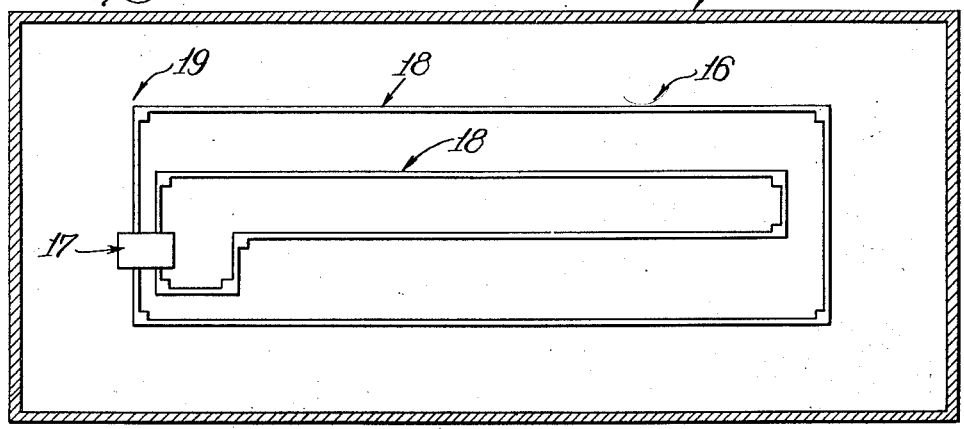
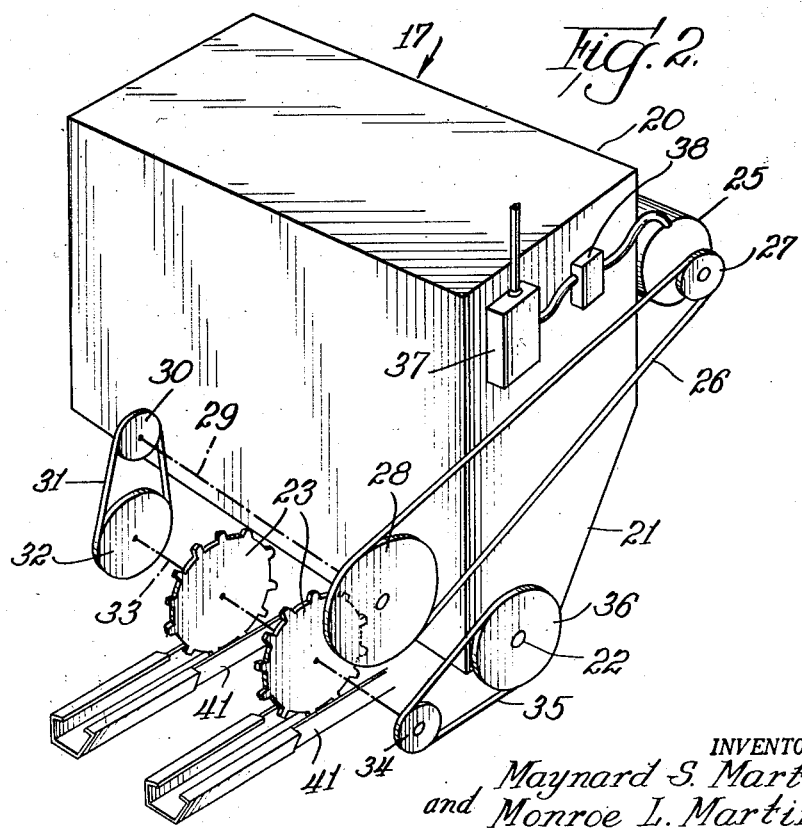
INVENTORS:
Maynard S. Martin
and Monroe L. Martin

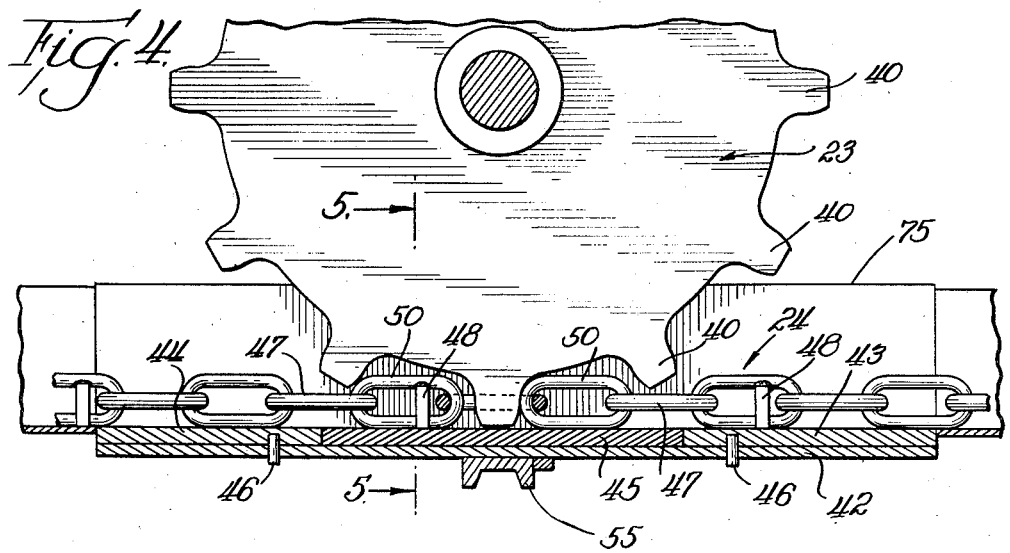
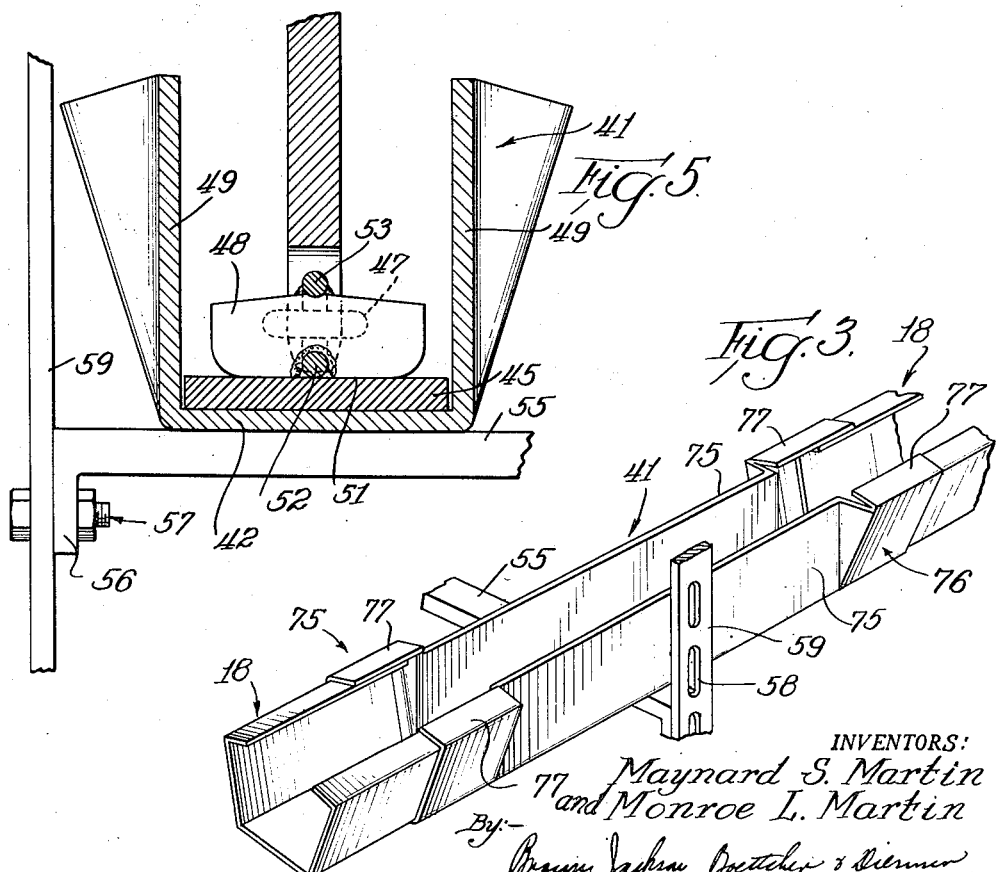

Feb. 26, 1957 M. S. MARTIN ET AL 2,782,761
AUTOMATIC POULTRY FEEDER
Filed Aug. 11, 1951 4 Sheets-Sheet 3
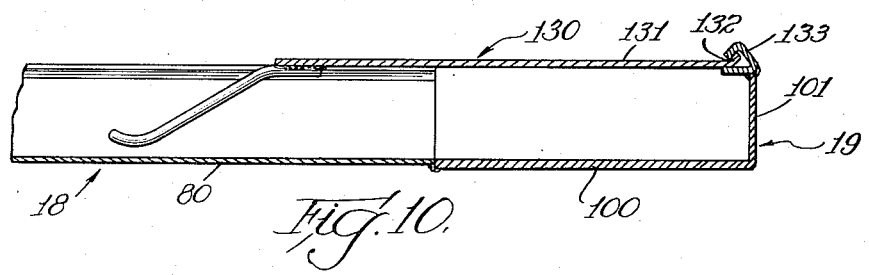
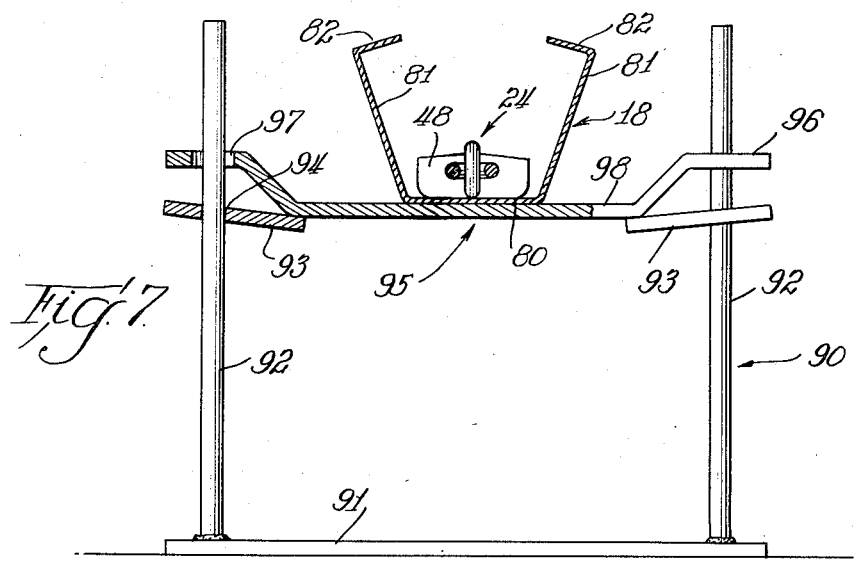
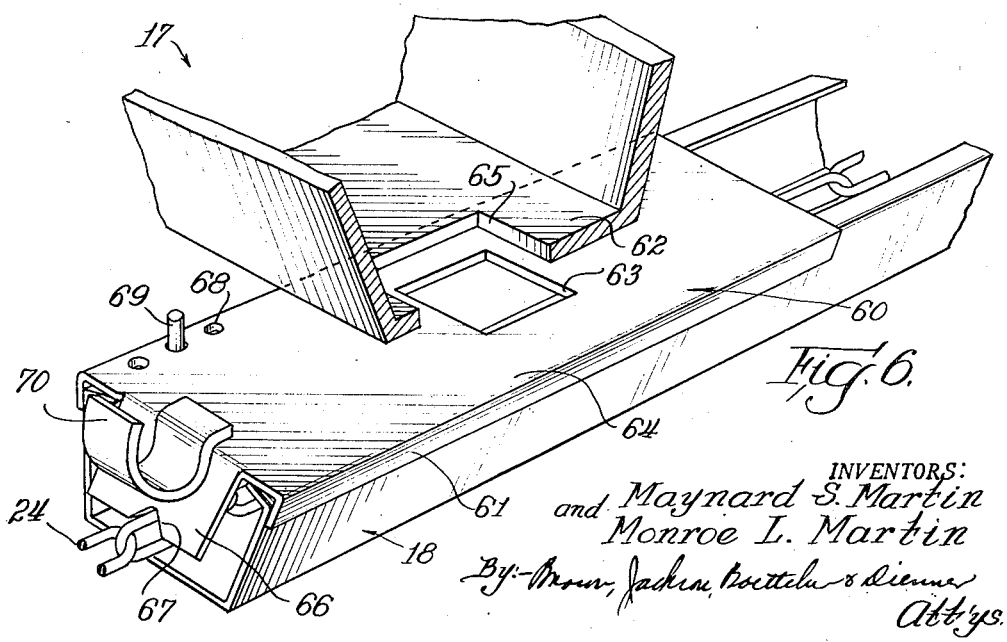
INVENTORS:
Maynard S. Martin
and Monroe L. Martin Feb. 26, 1957   M. S. MARTIN ET AL   2,782,761
AUTOMATIC POULTRY FEEDER
Filed Aug. 11, 1951   4 Sheets-Sheet 4
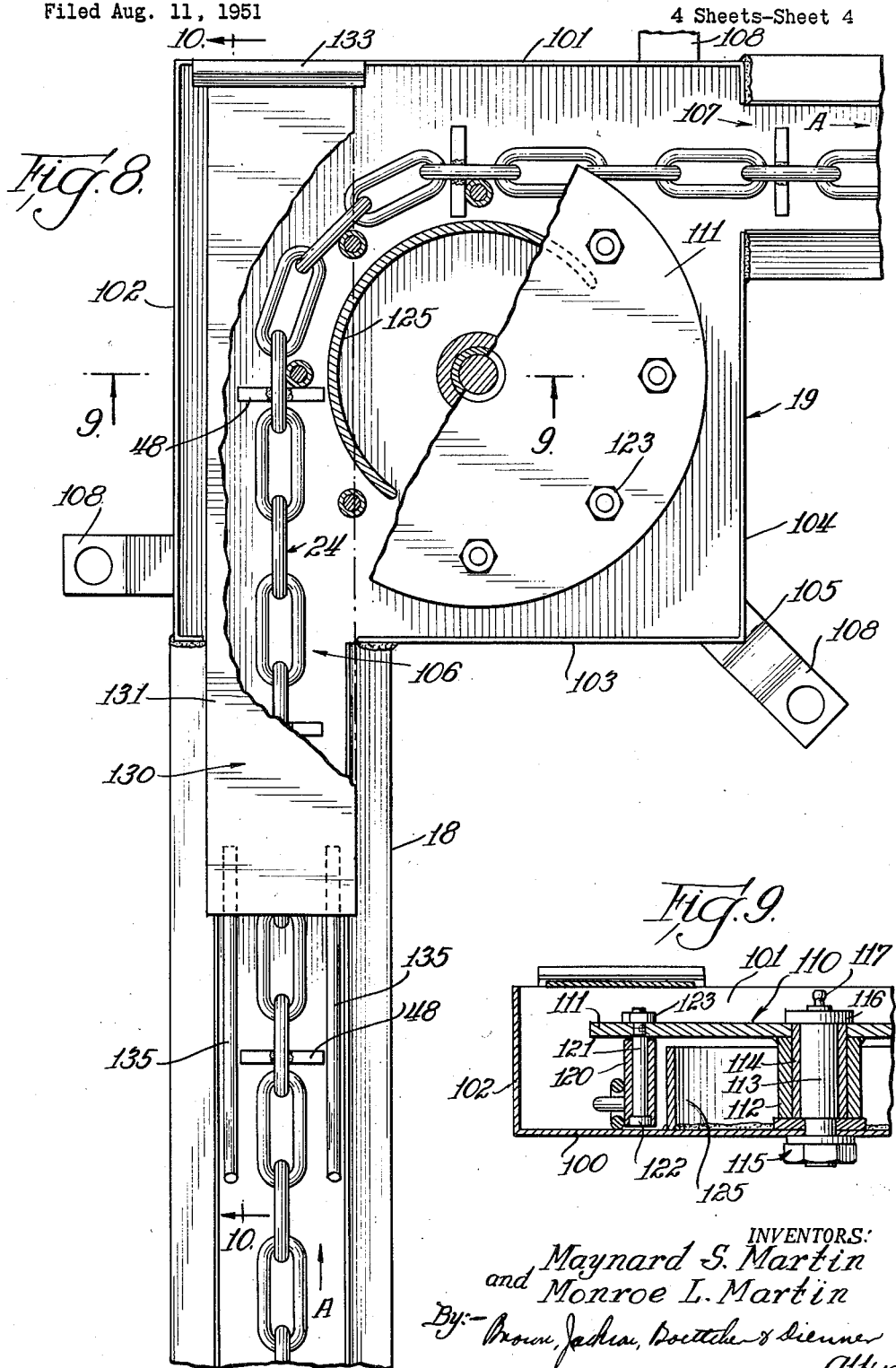
INVENTORS:
Maynard S. Martin
and Monroe L. Martin
By:— Brown, Jackson, Boettcher & Dienner
Attys.

United States Patent Office 2,782,761
Patented Feb. 26, 1957

2,782,761

AUTOMATIC POULTRY FEEDER

Maynard S. Martin and Monroe L. Martin, Goshen, Ind., assignors, by direct and mesne assignments, to Gerald L. Kitson, Rockford, Mich., and Nat Cordis, Silver Lake, Wis.

Application August 11, 1951, Serial No. 241,451

6 Claims. (Cl. 119—52)

Our invention is concerned with poultry feeders and more particularly with the features of construction and operation of an automatic type of poultry feeder utilizing an endless chain conveyor for transporting poultry feed along an endless feed trough.

In the feeding of a large number of birds such as chickens, ducks, turkeys or the like on a commercial basis, it is not at all uncommon to find a farmer or a poultry raiser feeding as many as several thousand birds at one time. In such circumstances the burdensome and time consuming operations of feeding the birds by hand desirably are replaced by a mechanical feeder of some type. It is to this field of mechanized poultry feeders that our present invention is directed.

Briefly, we propose to display the features of a device which makes possible the feeding of several thousand birds or the like, in an automatic and efficient manner. To this end we have provided a specially designed endless chain type of conveyor and feed troughing which may be tracked as desired to form one or more endless trough circuits or runs, along the floor of a poultry feeding house whereby feed automatically may be supplied from a storage bin or hopper and mechanically conveyed about the poultry house to avoid laborious hand feeding operations.

Among the many objects of our invention is that of displaying the features of operation and construction for a workable, efficient and simple automatic feeding apparatus especially adapted for conveying feed grain, mash or the like, either in a wet or a dry state, to a large number of birds such as chickens, ducks, turkeys or like fowl.

Another important object of our invention is to set forth the features of a new and improved conveyor chain especially adapted for moving finely divided material along a trough associated therewith.

Another object of our invention is to demonstrate the features of a new and improved sheave means for facilitating the turning of corners with an endless type of chain conveyor.

Still another object of our invention is to set forth a mode of constructing a new and improved drive means for moving the chain conveyor along an endless feed trough or the like.

The above and further objects and features of our invention will become apparent to one skilled in the art from the following detailed description thereof and with reference to the accompanying drawings of one embodied form of our invention.

In the drawings:

Figure 1 is a reduced scale top plan schematic view of a large commercial poultry feeder house, demonstrating the general arrangement of our feeder means therein;

Figure 2 is an enlarged perspective view of a feed hopper and drive mechanism associated with our feeder, as indicated generally in Figure 1;

Figure 3 is an enlarged perspective view of a section of the feed trough which passes under the hopper and drive mechanism shown in Figure 2 of the drawings;

Figure 4 is a further enlarged elevational view in partial cross section showing the cooperative arrangement of one of the driving sprockets, shown in Figure 2, and the trough section which is shown in Figure 3;

Figure 5 is a cross sectional view taken substantially along lines 5—5 of Figure 4 and looking in the direction of the arrows, such view demonstrating the detailed arrangement of supporting means for the trough section shown in Figure 3 and the relation of the conveyor chain to the driving sprocket as demonstrated in Figure 4;

Figure 6 is an enlarged perspective view demonstrating the arrangement by which the flow of feed from the hopper, illustrated in Figure 2 of the drawings, is regulated in its passage to the troughing of our feeder;

Figure 7 is a typical intermediate section of the trough taken between supports, with parts of the supports being in section;

Figure 8 is a top plan view, with parts thereof broken away in section, demonstrating a new and improved sheave means for carrying the endless feeder chain of our feeder about a corner and turning the same through a desired angular turn;

Figure 9 is a partial sectional view taken substantially along line 9—9 of Figure 8, looking in the direction of the arrows therein and demonstrating the detailed features of construction of the sheave means shown in Figure 8 of the drawings; and Figure 10 is a cross section elevational view at reduced scale taken substantially along line 10—10 of Figure 8 and showing the details of a novel protective means for preventing the feeding birds from becoming entangled within the sheave member demonstrated in Figure 8.

Referring now to the drawings, it will be recognized from Figure 1 in particular that a poultry feeder house indicated generally by numeral 15 therein has been provided with an internally disposed automatic feeder means indicated generally at 16, which comprises the features of our invention and includes a hopper and drive means 17, a plurality of interconnected lengths of feeder trough 18 suitably arranged to form a pair of closed or endless trough runs on circuits utilizing, at the several corners thereof, our sheave members 19. An endless conveyor chain 24, is carried along the troughing, as illustrated in Figures 4 and 8 of the drawings. To facilitate an understanding of the comparative dimensions involved in an installation such as we have illustrated in Figure 1, it is of interest to note that the poultry house 15 bears rectangular dimensions in the nature of 100' x 50' and that the outer or larger run of troughing is substantially rectangular and bears dimensions in the nature of 88' x 27' with the inner run of troughing being substantially 80' long, 7' across at its narrowed end, and 15' across at its end adjacent the feed hopper 17.

With particular reference to Figure 2 of the drawings wherein the feed hopper and drive means 17 is illustrated, it will be recognized that a hopper member 20 comprises a substantially rectangular box provided for storing a given quantity of suitable poultry feed within its hollow interior; such box having one sloping lower side 21 to facilitate the gravitational feeding of the grain downwardly to the lower end thereof across which a suitable internal paddle or agitator means (not illustrated) is mounted on a transversely positioned shaft 22. A pair of coaxial, side-by-side, parallel spaced sprocket wheels 23—23 are provided in front of the hopper 20 for driving engagement with the chain member, indicated at 24 in Figure 4 of the drawings, for moving the latter along the feeder troughing 18, as will be described in detail later herein. Suitable means for rotatably driving the agitator shaft 22 and the two sprocket wheels 23 is provided and such may comprise any suitable driving means powered by an electrical motor 25 or the like, which is mounted on one side of the hopper member 20, as illustrated. In the particular drive arrangement herein illustrated, a belt or chain member 26 engages a first sheave wheel or sprocket 27 mounted on the exposed end of the armature shaft of motor 25 and a larger sheave or sprocket wheel 28 which is positioned adjacent the drive sprockets 23. A transverse shaft 29 interconnects wheel 28 with a second smaller sheave or sprocket wheel 30 which in turn is connected by belt or chain means 31 to a larger sheave or sprocket wheel member 32 mounted coaxially with drive sprockets 23. A sprocket shaft 33, supports wheel 32 of one end and the two sprocket wheels 23 intermediate its length for coaxial rotation therewith. At the opposite end of sprocket shaft 33 a small sheave or sprocket wheel 34 is provided which is connected by belt or chain means 35 to a larger sheave or sprocket wheel 36 mounted at the exposed end of the agitator shaft 22 exteriorly of hopper member 20. Any suitable means for rotatably supporting the shafts 29 and 33 may be introduced in a manner obvious to one skilled in the art. It will be recognized that the several wheel members 27, 28, 30 and 32 are arranged in a manner to rotatably drive the driving sprockets 23 at a reduced speed from that of the armature of motor 25. Also associated with motor 25, there is preferably a control switch, indicated generally at 37 having electrical connection with a suitable timer switch or relay 38 for providing intermittent and automatic actuation of the drive means hereabove described.

In connection with the driving arrangement between the sprocket wheels 23 and the chain member 24, reference is made to Figures 3 through 5 of the drawings, wherein we have illustrated the details of our driving arrangement. It will be recognized from these figures, that the teeth 40 of the sprocket wheels have driving engagement with the chain member 24 associated therewith and cooperate with an underlying wear plate trough section 41 in driving chain 24. With reference to Figures 3 and 4 in particular, it will be observed that the wear plate trough section 41 comprises a substantially open top U-shaped elongated rectangular metal member carrying along its bottom wall 42 a recessed three-sectional metal plate comprising a pair of separated short end sections 43 and 44 and an intermediate removable wear plate section 45. The two end sections 43 and 44 are suitably secured to an underlying wall 42 of the wear plate trough section 41 by means of vertical pins 46; such plates being positioned at opposite ends of trough section 41 to abuttingly embrace the interlying and coplanar wear plate member 45 therebetween. It will be recognized from Figures 4 and 5 in particular, that each sprocket tooth 40 approximately contacts wear plate 45 when engaging the open center portion of a horizontal link element 47 of the feeder chain 24, so that the feeder chain 24 is carried and fed between the overlying sprocket wheel 23 and the underlying wear plate 45. Further, it should be noted that each of the sprocket wheels 23 is thusly arranged with a wear plate trough section 41 and an underlying individual wear plate 45. Since the attritional effect of thus driving the chains 24 is considerable on the wear plates 45 such are removable for periodic replacement. To promote registering engagement between sprocket teeth 40 and the horizontal link elements 47 of the chain members 24, flight members 48, herein shown as substantially rectangular metal plates of a length slightly less than the distance between side walls 49, 49 of the wear plate trough section 41, are mounted transversely to the chain vertical link elements 50 which are combined in an alternately transverse and recognized manner with the horizontal link elements 47 to make up an articulated feeder chain 24. In this latter connection, it is important that the flight elements 48 be positioned in spaced relation on alternate or spaced vertical link elements 50 of the chain member 24, and that such are securely welded or otherwise fastened thereto in such a manner as to promote a flush relationship between the lower edges 51 of the flight members 48 and the lower arms 52 of the vertical link elements 50, as illustrated in Figure 5 of the drawings. Further, as shown herein, the flight elements do not extend above upper arms 53 of the vertical link elements 50, but are welded securely to the underside thereof. In order that the lower arm 52 of a chain link 51 may be mounted flush with the lower edge of a flight element 48, a U-shaped aperture is provided intermediate the length of each of the flight members 48 for the registering reception therethrough of a lower arm 52 of a vertical link member 50. As will be recognized from Figure 5 of the drawings in particular, the flight members are tapered to extend downwardly from the upper arms 53 of each of the link members 50 to which they are attached and have their lower corners rounded at a suitable radius to prevent undue wear between the flight members and the underlying troughing upon which they ride. In function, the flight members 50 serve three purposes; namely, that of providing means in conjunction with the several links of the chain 24, to push feed along the feeder troughing 18; to maintain the several links 50 to which they are attached in a desirable vertical position, whereby the intervening links 47 of the chain are maintained in a substantially horizontal position for ready engagement with the teeth 40 of a sprocket wheel 23, and to guide the chain into registering alignment in the wear plate trough section 41 for driving engagement by the sprocket wheel 23.

As will be recognized from Figures 3 and 5 of the drawings, means are provided for adjustably supporting the wear plate trough section 41 beneath the drive sprockets 23, comprising a horizontally disposed channel bar member 55 adapted to underlie and support the two trough member sections 41, illustrated in Figure 2 of the drawings, in proper position relative to the drive sprockets 23. Channel bar 55 is provided with a right angularly turned end portion 56 at each end for the inserted reception therethrough of a holding bolt and nut means 57, adjustably engageable with slotted apertures 58 formed in a vertical ground engaging stanchion member 59, one of which is positioned on either side of the two spaced wear plate trough sections 41, as partially illustrated in Figures 3 and 5. The adjustability of the cross channel bar 55 relative to the vertical stanchion members 59 permits convenient adjustment of the wear plate member 45 relative to the teeth 40 of drive sprocket 23 whereby positive driving engagement and regulating of the contact pressure between the sprocket teeth and the feeder chain 24 is assured at all times.

To insure a regulated filling of the trough members from the storage hopper 20, I have provided a regulating gate means 60, as illustrated in Figure 6 of the drawings. The regulating gate 60 comprises a planar metal cover plate having downwardly turned side edges 61 adapted to embrace and fit snugly over the upper lateral extremities of an underlying trough 18 located immediately below a lower wall 62 of hopper member 20. It will be recognized that the regulating gate 60 has an aperture 63 formed in the upper planar wall 64 thereof, intermediate its lateral edges 61, for registering alignment with a similar sized aperture 65 formed in the bottom wall 62 of hopper member 20. At one end of the gate member 60, I have provided a downwardly turned and angularly disposed end wall member 66 suitably notched intermediate its lateral limits and along the lower edge thereof as at 67 for the passage therethrough of the vertical links 50 of chain member 24. Wall member 66 further serves to regulate the amount of feed carried from the hopper along the trough sections since such is spaced a given vertical distance above the bottom wall of the trough whereby as the feed is carried therepast wall member 66 serves to level the feed across the bottom of the trough to a desired maximum height or level. Means for securing the regulator gate 60 to trough section 18 is provided along one edge thereof and comprises a plurality of spaced openings 68 through which a locating pin member 69 is to be inserted for engagement within a single opening (not illustrated) formed in upper edge of the troughing 18. Positioning of the pin 69 in either of the two end openings 68 in the gate member 60 serves to shift the aperture 63 therein relative to the overlying opening 65 in the hopper whereby the passage from the hopper to the troughing 18 is restricted and the feed flow diminished, if desired. Means for withdrawing the regulating gate 60 from beneath the hopper means 17 is conveniently provided by means of a hook type of handle member 70 mounted adjacent the leveling end wall member 66, as shown in Figure 6 of the drawings; such being welded to the upper planar wall 64 of the regulator gate or otherwise suitably fastened thereto in a rigid manner. In function the regulator gate 60 serves to enclose a section of the troughing immediately below the discharge opening 65 of the hopper whereby, when such an enclosed cavity is filled with feed or the like, the gravitational draining of feed from the hopper 17 is terminated until the feed blocked up within the cavity is sufficiently cleared by movement of chain member 24. From this construction it will be recognized that if perchance the chain 24, for any reason such as the lack of feeding on the part of the birds, continues to drag a substantial amount of feed around the troughing circuit, causing a filling up of the cavity beneath the hopper opening 65 and the regulator plate 60, the gravitational drain of feed from the hopper temporarily will be terminated pending clearance of the trough enclosure immediately below the hopper by the chain and the flights 48 attached thereto.

From a study of Figure 3, it will be recognized that the wear plate cross section 41 comprises a pair of vertical wall members 75 suitably interconnected at the lower edges by a lower wall 42 and that such side wall members 75 are bent outwardly at opposite ends to form a trapezoidal cross sectioned portion at each end thereof indicated generally by numeral 76 and distinguished by inwardly turned upper lip edges 77 to form a receiving sleeve for the inserted reception therein of an adjacent end portion of a length of troughing 18; the trough 18 having a similar trapezoidal cross sectional configuration, as illustrated in Figures 3 and 7. In this latter connection, it will be recognized from Figure 7 of the drawings, that the troughing 18 comprises a planar bottom wall 80, a pair of angularly disposed upwardly reaching side walls 81 formed integrally therewith, and inwardly turned lip portions 82 at the upper reaches of the side walls 81 to provide a trapezoidal troughing suitable for the carrying of poultry feed or like granular material. Preferably, the troughing is to be made of a suitable gauge sheet steel or like material, with abutting sections thereof being interconnected by means of enlarged trapezoidal sleeve sections, similar to sections 76 associated with the opposite ends of the wear plate trough sections 41 illustrated in Figure 3 of the drawings.

Adjustable supporting and suspension of the troughing 18 is provided by periodically spaced support members 90, as illustrated in Figure 7, which are placed at convenient intervals along the length of the troughing to support the same at a desired level above the flooring of the feeder house 15. In this latter connection, it will be recognized that the support members 90 comprise a lower foot member 91, at each end of which is positioned a vertically extending post member 92, herein shown as cylindrical rod, and onto each of which is slidably mounted a rectangular collar member 93 provided with an aperture 94 adjacent one end thereof, of a size slightly larger than the diameter of the vertical rods 92 which are received therein. Reaching intermediate each pair of rods 92 is provided a supporting bar 95, distinguished by a pair of upwardly offset platform sections 96 comprising the opposite ends thereof and through which an aperture 97 is formed, preferably of an elongated slotted configuration for loose reception on the rod members 92 therethrough. The troughing 18 is placed intermediate the extremities of the supporting bar 95 and may be welded to a central platform section 98 thereof. It will be recognized that the collar members 93 are turned inwardly to reach beneath the lower offset platform section 98, and that the weight of the troughing and bar member 95 provides a cantilever loading of the collars serving to wedge the sides of the apertures 94 in collar members 93 against the vertical rod members 92 with locking engagement. Thus is provided a readily adjustable supporting means for the troughing, which will enable one to regulate the vertical positioning of the troughing relative to the ground or flooring of the feeder house and accommodate any irregularity in the elevation of the latter by merely releasing the collars 93 and positioning the troughing at the desired level.

As illustrated in Figure 1 of the drawings, it will be seen that the trough lengths 18 are turned at several corners in their endless run by sheave members 19, which serve effectively to permit the turning of the conveyor chain around a right angular corner, such a sheave member being illustrated in detail in Figures 8 and 9 of the drawings.

Looking at Figures 8 and 9, it will be recognized that the sheave member 19 therein illustrated comprises an outer metal housing consisting of a bottom wall 100 of a substantially square configuration, bordered by four vertical wall members 101, 102, 103 and 104, which may be separate wall elements welded to the bottom wall 100 or formed integrally therewith by means of a suitable bending operation. It will further be recognized that walls 103 and 104 are interconnected at adjacent edges to form one corner 105, but terminate prior to reaching walls 101 and 102 to provide inlet and outlet openings 106 and 107 respectively for the passage of the chain member 24 therethrough. Troughing sections 18 are to be connected in abutting relation to side walls 103 and 104, opposite the inlet and outlet openings 106 and 107 as by welding or by larger receiving sleeve members similar to connectors 76 utilized with the wear plate trough sections 41. Tab members 108 are provided adjacent three corners of the sheave member 19 for the reception and mounting therewith of suitable supporting brackets, such as 90 illustrated in Figure 7; adjustable vertical positioning of the sheave member relative to the floor of the feeder house being accomplished by identical means as that illustrated in Figure 7 for supporting the trough members 18, as heretofore described. Positioned intermediate the several side walls and over the bottom wall 100 of the sheave member 19 we have rotatably mounted a sheave drum 110 comprising an upper circular plate member 111 having a centrally disposed hub member 112 extending vertically downwardly therefrom for the reception of a stub axle 113 and a sleeve-type bearing 114, which surrounds axle 113, as illustrated, in particular, in Figure 9 of the drawings. The lower end of axle 113 is provided with locking nut and washer 115 and the upper end thereof terminates in an outwardly extending circular collar member 116 provided with a suitable grease fitting 117 to complete the rotatable assembly for the sheave drum 110. Positioned at conveniently spaced intervals and inwardly from the circumferential limits of the circular plate member 111 are a plurality of downwardly extending roller fingers 120, rotatably supported on axle members 121. Each of the axle members 121 is provided with an enlarged cylindrical collar bearing 122, which is engageable with an enlarged cylindrical opening at the lower end of the roller members 120 to prevent the latter from slipping off of their supporting axle members 121. The upper end of each of the axles 121 is suitably provided with a threaded portion and a nut member 123 for connecting the same to the circular plate member 111 of the sheave drum 110. Placed radially inwardly of the rollers 120 on the bottom wall 100, is an upwardly extending curvilinear wall member 125, partially surrounding the central hub 112 of the sheave drum 110; this wall being provided to prevent the infiltration of feed or the like around the hub of the sheave drum to alleviate the fouling and jamming of the rotatable supporting hub axle and bearing means therefor. As will be appreciated from Figure 8 of the drawings, the chain member 24 is suitably trained around the sheave drum member 110, with the transversely positioned flight members of the chain being engaged and carried by the rollers 122 of the sheave drum, the latter of which axially rotate in their contact with the chain as it is carried around the turn of the corner and rotates the sheave drum about axle member 113.

Since the danger of injuring small chicks or fowl is always prevalent in using a mechanical feeder system, as heretofore described, and which condition is especially true as related to the rotating sheave members 19 of our assembly, we have provided a suitable safety plate member 130, as illustrated in Figures 8 and 10 of the drawings. It will be recognized from Figure 8 that the chain 24 moves through the sheave member 19, as indicated by arrows A—A of that figure; such being the case, our safety plate 130, which is adapted to prevent the carrying of small chicks into the rotating sheave drum 110, is mounted transversely of the sheave housing over the incoming side of the chain 24, as illustrated. The safety plate 130 is composed essentially of a rectangular plate member 131 of a length suitable to bridge across the opposite walls 101 and 103 of the sheave members 19; such being hingedly or articulately connected to wall 101 by means of an upwardly turned lip section 132 formed at one end of the plate member 131, which is engageable in a bracket fastener 133 comprising a metal plate suitably bent into substantially triangular cross sectional configuration, and open at one side thereof for the reception therein of lip member 132. It will be appreciated that the engagement of lip member 132 with the bracket member 133 serves to tie down one end of the safety device 130. At the opposite end of plate member 131, we have provided a pair of rod-like prong members 135 which are suitably fastened thereto in a rigid manner, as by welding or the like, and extend angularly downward therefrom toward the bottom of the incoming section of troughing 18, so as to be supported slightly above the lower wall 80 thereof. It will be recognized that the two separated prong members 135 are spaced sufficiently to clear the flight members 48 associated with chain member 24 to permit the passage therebetween of the chain and flights, and that such serve as a scoop means for elevating birds carried along by the chain member 24 out of the troughing 18 and up onto the upper side of a plate member 131, of our safety device 130. It further will be appreciated that such a safety device is unnecessary with the outgoing side of the chain as it passes through opening 107 in the sheave members 19, since the chain serves effectively to carry any birds that are in this area outwardly of the sheave drum, with little danger of their injury.

Having thus described the particular elements which go to make up the embodied features of our invention the combined assembly thereof into a set of enclosed endless conveying trough runs or circuits, as illustrated in Figure 1, is obvious. Briefly, however, the operation of our feeder system is as follows: Feed is placed in hopper member 20 and upon actuation of the motor 25, as controlled by the time relay switch 38, the agitator within the hopper is driven by the power take-off wheels 34 and 36, associated with the drive means for the two drive sprocket wheels 23. The drive sprockets 23, of course, serve to engage and move the conveyor chains 24 along the troughing 18 which is positioned across the floor of the feeder house in two endless runs or circuits with the chain members 24, riding along the bottom thereof, being formed as endless loops of chain. Flight members 48, associated with the chain members 24, serve effectively to carry feed along the bottom of the troughing, with the several corners required to form the closed loop of the troughing being distinguished by our sheave members 19, which serve to permit easy turning of the chain through a right angle turn as illustrated. The feed, of course, is available to the fowl through the open top of the troughing, and as the feed is consumed by the birds, motor 25 is intermittently energized to insure a desired supply of feed along the length of both the trough runs. The feed regulating plates 60, associated with each of the endless troughs serve to regulate the gravitational discharge of the feed supplied from the hopper member 20 as described heretofore. The supporting means 90, as illustrated in Figure 7 of the drawings, permits regulation of the elevation of the trough sections, so that such may be arranged in a substantially horizontal manner across the flooring of a feeder house, with the adjustable regulating devices 93 associated with the rod members of the supporting brackets serving to permit the adaptation and adjustment of the troughing to irregular floor elevations of the feeder house. While we have herein illustrated a feeder utilizing two endless tracks of troughing, it, of course, will be recognized that such is not necessary to the concepts of our invention, but that one or more than two tracks of troughing may be utilized if desired.

While we have herein shown and described one form in which the features and concepts of our invention may appear, it readily will be recognized that numerous changes, modifications and substitutions of equivalents may be made therein without departing from the spirit and scope of our invention, and we therefore do not wish to be limited to the specific embodiment illustrated and described, except as may appear in the following appended claims.

We claim:

1. For use in an automatic poultry feeder of the type utilizing an endless open top feeder trough for carrying feed throughout a poultry house or the like, an articulated, endless conveyor chain for moving said feed along said endless trough, comprising a plurality of articulately interlocked, alternately transverse, open-centered, link elements and a plurality of equal, planar flight members extending transversely and symmetrically of a vertical plane passing through the longitudinal axis of said chain, said flight members being mounted to and extending transversely between lower and upper arms of certain separated links of said chain with said lower arms passing therethrough so that the lower extremities of said flight members and said lower arms of said certain links, to which they are attached, lie in a flush relation for coplanar sliding engagement with a bottom planar wall of said trough; said certain links thereby being maintained by said flight members in a substantially vertical upright position during movement of said chain along said trough with other intervening and transversely related links being maintained in a substantially horizontal position for the reception and engagement in open center portions thereof of teeth members associated with a rotatable driving sprocket mounted over said trough in a substantially coplanar relation with said certain links for driving engagement with said chain.

2. For use in an automatic poultry feeder of the class described, the combination comprising, an endless open trough having a plurality of right angular turns therein at desired positions along its length to accommodate its endless disposition, an endless, articulated, feeder chain slidingly movable along said endless trough, a plurality of transversely extending and spaced flight members mounted at desired intervals along said chain and fastened rigidly to certain link elements thereof, the longitudinal axis of said chain passing through substantially the center of each of said flight members, said flight members embracing lower arms of said certain links and having their lower edges lying in a substantially coplanar flush relation with the lower extremities of said lower arms, said flight members riding on a planar bottom wall of said trough whereby said flights serve to maintain said certain links in a substantially vertical position with other intervening and transversely related links of said chain consequently being maintained in a substantially horizontal position; a rotatably driven sprocket member mounted above said trough and having a plurality of radially spaced teeth thereon receivable in open centers of said horizontally maintained other links for driving engagement with said chain, and a plurality of rotatable sheave members, one at each of said turns in said endless trough for carrying said chain therearound, each of said sheave members including a rotatably supported circular plate member positioned to one side of said chain and having a plurality of radially positioned, vertically depending, roller fingers mounted adjacent its periphery for rolling engagement with said certain links and flight members of said chain in carrying the latter around said turns.

3. For use in an automatic poultry feeder of the class described having an endless conveyor trough for carrying feed, an endles, articulated, link chain slidably movable along said trough, a plurality of vertically disposed flight members mounted at intervals along the length of said chain with said chain's longitudinal axis passing through substantially the center point of each of said flight members, transversely embracing certain links of said chain to maintain the same in vertical upright position as the lower edges of said flight and the lower extremities of said certain links attritionally engage and move over a planar bottom wall of said trough, a plurality of rotatable sheave members positioned along said trough, each comprising a turn portion of said trough in which a rotatable plate member is mounted having a plurality of vertical, rotatable, finger members depending adjacent its periphery, said finger members engaging said flights and driving said chain around a corner in said trough's endless path while maintaining said flights engaged with said bottom wall of said trough.

4. For use in an automatic poultry feeder of the class described, having an endless open top trough and an endless articulated link chain mounted for sliding movement along a bottom planar wall of said trough, said chain having a plurality of vertically maintained spaced flight members, a plurality of rotatable sheave members, each forming a corner turn in said trough and serving to guide said chain through said turns, each sheave member comprising, a housing, a rotatable plate member mounted in said housing for rotation about a central vertical axis disposed to one side of said chain, a plurality of radially disposed rotatable finger members mounted dependingly adjacent the periphery of said plate for tangential rolling contact with said chain, said fingers engaging said chain adjacent said flight members and maintaining said flight members in vertical disposition during the turning movement of said chain; a safety plate member partially covering over the top of each of said sheave housings, articulate connective means securing said safety plate at one end to said housing for vertical arcuate movement, and a pair of downwardly extending, separated prong members at the opposite end of said safety plate, said prong members being so constructed and arranged as to reach into said trough at the incoming side of said sheave and extend along opposite sides of said incoming chain to prevent poultry from being carried into said rotating sheave by said chain.

5. For use in an automatic poultry feeder of the class described, the combination comprising feeder trough means providing access to poultry, an endless conveyor means slidably movable along said trough means and consisting of articulately interlocked link elements, angular turns and bends at desired positions along the path of said endless conveyor means, a plurality of transversely extending planar flight members mounted at desired intervals along said articulated conveyor means and fastened to certain link elements thereof which lie in a vertical plane passing through the longitudinal axis of said conveyor, the said longitudinal axis of said conveyor passing through substantially the center point of the face of each flight member, said flight members transversely embracing said certain of said link elements of said conveyor and extending symmetrically of the vertical plane passing through the longitudinl axis of said conveyor to maintain the same in axially aligned position while travelling along said trough means with the lower portions of said flights attritionally engaging and moving over wall portions of said trough means, a plurality of rotatable sheave members positioned along said trough means, each of said sheave members including a rotatably supported circular member positioned to one side of said conveyor means and having recessed peripheral means for receiving the conveyor links and for engaging said symmetrically arranged flight members in carrying the conveyor means with its link elements and flight members about said sheaves, enclosed housings for each of said sheaves, said housings having an entrance port and an exit port for said endless articulated conveyor means, said entrance ports of said housings being narrower than the troughs in the trough means and being constructed and arranged on the incoming side of said sheave to provide a clearance no greater than necessary to admit said flight members and thereby prevent poultry from being carried into said rotary sheave by said conveyor means.

6. The feeder of claim 5 wherein said certain link elements alternate with link elements lying in a horizontal plane passing through the longitudinal axis of the conveyor and wherein said flight members are fastened intermediate the ends of the link elements on which they are mounted.

References Cited in the file of this patent

UNITED STATES PATENTS

| 871,469 | Bliedung | Nov. 19, 1907 |
| 2,589,706 | Kitson et al. | Mar. 18, 1952 |
| 2,591,609 | Roberts et al. | Apr. 1, 1952 |

OTHER REFERENCES

Automatic Poultry Feeder Plan, Progress Report No. 2, September 1948, Pennsylvania State College, School of Agriculture, State College, Pennsylvania.

Big Dutchman News of Zeeland, Michigan, published by the Automatic Poultry Feeder Co., November 1950.

The Buckeye E-Z Automatic Poultry Feeder, published by the Buckeye Incubator Co., Inc., August 1950.